United States Patent
Finne et al.

(10) Patent No.: US 12,152,730 B2
(45) Date of Patent: Nov. 26, 2024

(54) METHOD OF MONITORING LIQUEFIED GAS IN A CRYOGENIC LIQUEFIED GAS TANK AND A CRYOGENIC TANK

(71) Applicant: WÄRTSILÄ FINLAND OY, Vaasa (FI)

(72) Inventors: Markus Finne, Vaasa (FI); Raymond Walsh, Vaasa (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 549 days.

(21) Appl. No.: 17/603,132

(22) PCT Filed: Apr. 12, 2019

(86) PCT No.: PCT/EP2019/059374
§ 371 (c)(1),
(2) Date: Oct. 12, 2021

(87) PCT Pub. No.: WO2020/207594
PCT Pub. Date: Oct. 15, 2020

(65) Prior Publication Data
US 2022/0196211 A1  Jun. 23, 2022

(51) Int. Cl.
*F17C 13/02* (2006.01)
*F17C 3/08* (2006.01)
*G01K 15/00* (2006.01)

(52) U.S. Cl.
CPC .............. *F17C 13/026* (2013.01); *F17C 3/08* (2013.01); *G01K 15/007* (2013.01);
(Continued)

(58) Field of Classification Search
CPC .................. G01K 15/007; F17C 13/026; F17C 2203/0629; F17C 2223/0161; F17C 2250/0417; F17C 2250/0439
See application file for complete search history.

(56) References Cited

U.S. PATENT DOCUMENTS

| | | |
|---|---|---|
| 10,598,538 B2 | 3/2020 | Kim et al. |
| 2016/0209259 A1 | 7/2016 | Edwards |
| 2017/0022920 A1 | 1/2017 | Hill |
| 2017/0363459 A1 | 12/2017 | Kim et al. |

(Continued)

FOREIGN PATENT DOCUMENTS

| | | |
|---|---|---|
| DE | 29615453 U1 | 10/1996 |
| DE | 19614112 A1 | 10/1997 |

(Continued)

OTHER PUBLICATIONS

International Search Report (PCT/ISA/210) with translation and Written Opinion (PCT/ISA/237) mailed on Jan. 27, 2020, by the European Patent Office as the International Searching Authority for International Application No. PCT/EP2019/059374. (8 pages).

(Continued)

*Primary Examiner* — Mirellys Jagan

(74) *Attorney, Agent, or Firm* — Buchanan Ingersoll & Rooney PC

(57) ABSTRACT

The present application relates to method and system of monitoring liquefied gas in a cryogenic liquefied gas tank having an inner shell and an outer shell and an insulation between the inner and outer shell. An exemplary method includes arranging an array of temperature sensors for measuring a temperature of the inner shell wall at different vertical positions, reading sensors in the array, performing a validity check of the sensors, and using only sensors which passed the validity check only, determining a state of the gas based on the temperature data.

18 Claims, 5 Drawing Sheets

(52) U.S. Cl.
CPC .......................... *F17C 2201/0109* (2013.01);
*F17C 2201/035* (2013.01); *F17C 2203/0391*
(2013.01); *F17C 2203/0629* (2013.01); *F17C
2203/0643* (2013.01); *F17C 2221/033*
(2013.01); *F17C 2223/0161* (2013.01); *F17C
2250/032* (2013.01); *F17C 2250/0417*
(2013.01); *F17C 2250/0439* (2013.01)

(56) References Cited

U.S. PATENT DOCUMENTS

2019/0368659 A1   12/2019   Rebernik

FOREIGN PATENT DOCUMENTS

| | | | | |
|---|---|---|---|---|
| FR | 2993344 | A1 * | 1/2014 | ............ F17C 13/126 |
| GB | 2517458 | A | 2/2015 | |
| JP | H07117790 | A * | 10/1993 | |
| KR | 20140076306 | A | 6/2014 | |
| KR | 10-1709056 | B1 | 3/2017 | |
| WO | 2015150455 | A1 | 10/2015 | |
| WO | 2017042424 | A1 | 3/2017 | |
| WO | 2018129571 | A1 | 7/2018 | |
| WO | 2019009977 | A1 | 1/2019 | |
| WO | WO-2020094221 | A1 * | 5/2020 | ............ F17C 13/021 |

OTHER PUBLICATIONS

Office Action (Notice of Grounds for Rejection) issued on Mar. 1, 2022, by the Korean Patent Office in corresponding Korean Patent Application No. 10-2021-7035822, and an English Translation of the Office Action. (22 pages).

* cited by examiner

METHOD OF MONITORING LIQUEFIED GAS IN A CRYOGENIC LIQUEFIED GAS TANK AND A CRYOGENIC TANK

TECHNICAL FIELD

The present invention relates to method of monitoring liquefied gas in a cryogenic liquefied gas tank according to the preamble of claim 1. Invention relates also to a cryogenic liquefied gas tank according to the preamble of the independent apparatus claim.

BACKGROUND ART

Invention relates to a field of storing liquefied gas at cryogenic conditions in a pressure proof tank, and instrumentation of the tank in an appropriate manner. By means of such instrumentation it is possible to measure and/or record the physical quantities of the gas in the tank. One of the most interesting quantity is the amount of the gas in the liquid phase, although other quantities may be desired to measure as well.

Radar level instruments are known as such which measure the distance from the transmitter/sensor to the surface of a liquid located further below in much the same way as ultrasonic level sensors, by measuring the time-of-flight of a traveling wave and then determine the level of the process material. They are regarded as continuous level measurement devices because they continue to measure level continuously while the level of the liquid in the vessel changes. The fundamental difference between a radar level instrument and an ultrasonic level instrument is the type of wave used. Radar level instruments use radio waves instead of sound waves used in ultrasonic instruments. Radio waves are electromagnetic in nature, with very high frequency in the microwave frequency range.

It is also know to define the level of the liquefied gas surface by pressure difference measurement between an upper ullage space of the tank and a bottom part of the tank. This method is quite inaccurate as the density of the liquefied gas in the tank varies over time and is not accurately known.

Since that invention concerns a liquefied gas tank, operational safety is an extremely important aspect in handling for example easily flammable gas, and in that respect, use of a double wall arrangement in a liquefied gas tank is known as such.

In publication WO2017042424A1 there is shown a LNG-fuel tank, which comprises an inner shell of stainless steel, an outer shell and a cavity 20 therebetween with an insulation. In WO2017042424A1 there is disclosed a manner of determining the fuel level in the tank using radar-based detector. For that purpose the LNG-fuel tank is provided with a manhole construction in the cylindrical shell portion of the tank via which the access into the interior of the LNG-fuel tank is made possible. The manhole is provided with means for determining the fuel level in the inner shell of the tank.

Document DE29615453 U1 discloses a device for level indication in containers for liquids and liquefied gases. It proposes to provide the container with a bracket into which a number of resistance temperature sensors are arranged and arranging the bracket inside the container. According to the document the determination of the liquid level in the container is based on a phenomena that a sensor which is immersed in the liquid provides less warming than such sensor which is above the liquid when the measurement current flows through the sensor.

Document DE19614112 A1 proposes to arrange temperature sensors outside an inner wall of a cryogenic container. This solutions requires that the insulation of the container is broken at least at the location of the sensor, which has undesired effect on the temperature measurement and also causes unnecessary heat transfer into the container.

An object of the invention is to provide a method of monitoring liquefied gas in a cryogenic liquefied gas tank in which the reliability of the operation is considerably improved compared to the prior art solutions.

DISCLOSURE OF THE INVENTION

Objects of the invention can be met substantially as is disclosed in the independent claims and in the other claims describing more details of different embodiments of the invention.

According to an embodiment of the invention method of monitoring liquefied gas in a cryogenic liquefied gas tank having an inner shell and an outer shell and an insulation between the inner and outer shell comprising.

arranging an array of temperature sensors for determining temperature of the outer surface of the inner shell of the tank at different vertical positions, reading sensors in the array of temperature sensors obtaining temperature data, performing a validity check of the sensors of the array of temperature sensors, in a case a sensor fails the validity check discarding the temperature data from further processing, and determining a state of the gas based on the temperature data of the sensors passed the validity check.

According to an embodiment of the invention the validity check of the sensors is performed by setting a reference value for the temperature data of the sensors, and comparing each temperature data of the sensors to the reference value and in a case where difference of the temperature data to the reference value is more than a predetermined allowed value discarding the temperature data of the sensor from further processing.

According to an embodiment of the invention the validity check of the sensors is performed by setting a temperature data of one of the sensors in the array of temperature sensors to be a reference value for the temperature data of the sensors.

According to an embodiment of the invention the validity check of the sensors is performed by setting a temperature data of horizontally adjacent sensors in the array of temperature sensors to be the reference value.

According to an embodiment of the invention the vertical location of the surface level of liquefied gas in the tank is determined based on the temperature data of the passed sensors only.

According to an embodiment of the invention the array of sensors comprises temperature sensors arranged at different predefined vertical and horizontal positions. Thus, two dimensional temperature distribution of liquefied gas in the tank is determined based on the temperature data of the passed sensors.

According to an embodiment of the invention the vertical location of the surface level of liquefied is determined by reading sensors in the vertical array of temperature sensors, and replacing any discarded temperature data with interpolated temperature data calculated using temperature data which passed the validity check.

According to an embodiment of the invention the vertical location of the surface level of liquefied gas is determined by reading superimposed sensors in the array of temperature sensors and replacing any discarded temperature data with temperature data of a sensor which passed the validity check being horizontally most adjacent to the discarded one.

According to an embodiment of the invention the vertical location of the surface level of the liquefied gas is determined at a first horizontal position by reading a first column of vertically superimposed sensors in the array of temperature sensors, and the vertical location of the surface level of liquefied is determined at a second horizontal position by reading a second column of vertically superimposed sensors in the array of temperature sensors.

A cryogenic liquefied gas tank according to the invention comprises an inner shell and an outer shell and an insulation between the inner and outer shell and a monitoring arrangement having an array of temperature sensors, wherein the monitoring arrangement comprises a computer unit comprising executable instructions to obtain temperature data from sensors in the array of temperature sensors, to perform a validity check of the sensors of the array of temperature sensors, and in a case a sensor fails the validity check, to discard the temperature data of the sensor from further processing, and to make use of sensors passed the validity check only for determining a state of the gas in the tank based on the temperature data of the passed sensors.

According to an embodiment of the invention the array of temperature sensors is in the insulation cavity.

According to an embodiment of the invention the sensors of the array of temperature sensors are arranged at different predefined vertical positions.

According to an embodiment of the invention the sensors of the array of temperature sensors are arranged at different predefined vertical and horizontal positions.

According to an embodiment of the invention the cryogenic liquefied gas tank has a computer unit comprising executable instructions to determine the vertical location of the surface level of liquefied gas by reading sensors in the vertical array of temperature sensors, and to replace any discarded temperature data with interpolated temperature data calculated using temperature data of sensors which passed the validity check.

According to an embodiment of the invention the computer unit comprising executable instructions to determine the vertical location of the surface level of liquefied gas by reading superimposed sensors in the array of temperature sensors and replacing any discarded temperature data with temperature data of a sensor which passed the validity check being horizontally most adjacent to the discarded one.

Invention relates also to a computer readable memory device comprising executable instructions which, when executed by a computer, cause the computer to carry out a method of any one of the appended method claims in connection with a cryogenic liquefied gas tank according to anyone of the appended apparatus claims.

A gist of the invention is to have the sensors fixed on certain levels in the insulation cavity between the inner and outer shell on the outer surface of the inner shell. This way penetrating one or both shells and insulation can be avoided. Also a possibility of forming thermal bridges is minimized. The redundancy of the sensors is made possible by arranging a predetermined number of sensors such that even if some of the sensors fails during the expected life time of the tank, those can be compensated or replaced by using adjacent sensors or mathematical interpolation. In order to provide service life of the array to last a nominal expected lifetime of the tank defined by the manufacturer, it is made possible by the invention that even if some of the sensors may become inoperable for any reason, the state of the gas in the tank can still be determined.

By mean of the invention it is also possible to detect and control stratification of a cryogenic tank as well as rollover phenomenon i.e. rapid release of gas vapours from a storage tank caused by stratification.

According to an embodiment of the invention the sensors are arranged vertically such that the distance between the sensors is 100 mm or less.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated. The novel features which are considered as characteristic of the invention are set forth in particular in the appended claims.

BRIEF DESCRIPTION OF DRAWINGS

In the following, the invention will be described with reference to the accompanying exemplary, schematic drawings, in which.

DETAILED DESCRIPTION OF DRAWINGS

Figure 1:
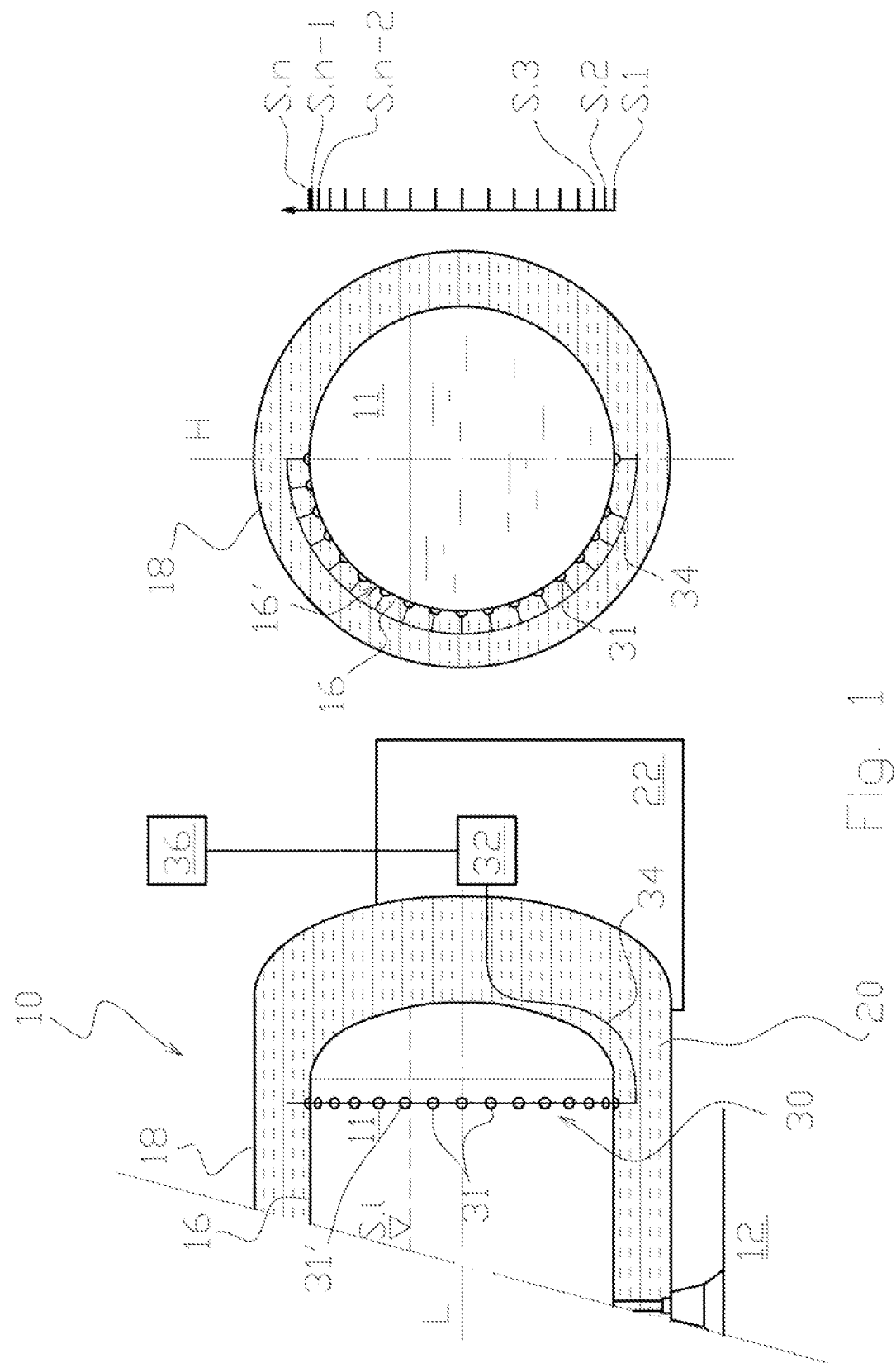
FIG. 1 illustrates a cryogenic liquefied gas tank according to an embodiment of the invention.

FIG. 1 illustrates schematically an end part of a cryogenic liquefied gas tank 10, which may be called also as a tank for sake of simplicity, arranged for example on a platform 12 of a marine vessel or a land based power plant. Practically the other end of the tank is substantially identical to the one shown in the figure and is not therefore shown here. FIG. 1 also shows a cross sectional view of tank 10 according to an embodiment of the invention. The tank 10 is of circular cross section and it has dome-like ends. The cryogenic liquefied gas tank may serve, for example, as a liquefied natural gas tank in accordance with a preferred embodiment of the present invention. It may be designed to be a pressure vessel also. The cryogenic liquefied gas tank 10 comprises an inner shell 16, which is advantageously of stainless steel to endure the circumstances in the tank. The tank space 11 within the inner shell 16 forms the liquefied gas storage space. The cryogenic liquefied gas tank 10 comprises also an outer shell 18, which may also be of stainless steel. There is an insulation cavity 20 between the inner shell 16 and the outer shell 18 which encloses the inner shell 16. The outer shell 18, in turn, encloses the insulation cavity 20. The insulation cavity 20 may be filled with a suitable insulating material and/or it may be, as it is the case in the FIG. 1, a vacuum insulation space forming the insulation. The inner shell 16 is supported on or to the outer shell 18 by means of supports arranged in the cavity 20.

The cryogenic liquefied gas tank 10 as is shown in the FIG. 1 is provided with a room or space 22 welded to, or by some other appropriate means arranged in gas tight connection with, the outer shell 18 of the tank 10 forming a safety barrier against unintentional gas leak. The space 22, which may be referred to as a tank connection space, is used for housing, in addition to monitoring and controlling devices, also e.g. a piping and instruments needed for filling or emptying the liquefied gas tank 10, not shown here.

The tank connection space 22 is normally a gas tight enclosure containing all tank connections, fittings, flanges and tank valves. It is constructed of cryogenic temperature resistant materials, optionally it has a bilge well with a high level indicator and a low temperature sensor. The tank connection space (TCS) is not normally accessible, it may not be entered by personnel unless checked for sufficient oxygen and absence of explosive atmosphere.

The tank 10 according to the invention comprises an array 30 of temperature sensors 31 configured for monitoring the state of liquefied gas in the cryogenic liquefied gas tank 10. According to a preferred embodiment of the invention, by means of the array 30 of the sensors 31 it is possible to define the surface level of the liquefied gas in the tank or generally the level change of phase of the gas in the tank. Also, additionally or alternatively, the state of the gas may comprise temperature distribution of the gas, both the liquefied portion and the gaseous portion, in the tank—depending on the configuration of the sensors 31. In the FIG. 1 the array comprises sensors 31 at different vertical positions arranged. The sensors may be arranged such that they are directly one above the other in a vertical inline-configuration. This kind of an array is configured to determine the vertical location of the surface level of liquefied gas in the tank 10.

As is depicted in the right side view of the FIG. 1 each sensor 31 is arranged at predetermined vertical position S.1-S.n. A zero height may be assigned to level S.1 which represent an empty tank while S.n represents full height H of the tank. Each vertical position S.1-S.n defines a predetermined height H from the bottom, or the zero height position. Thus the vertical position of each one of the sensors 31 is predetermined and is a known variable for determining the vertical location of the surface level. The array of temperature sensors 30 comprises its interface 32 for measurement and data signal(s) and for controls. In the FIG. 1 the interface is located in the tank connection space 22.

As is shown in the FIG. 1 the array 30 of temperature sensors 31 is non-removably arranged on the inner shell wall 16' of the tank 10 on opposite side to a storage space 11 of the tank 10 and inside the outer shell 18. The individual sensors 31 are attached in heat transfer connection with the inner shell wall 16'.

The attachment directly to the outer surface of the shell may be accomplished for example by glue or other adhesive joint. Effects of the invention may be obtainable to at least some extent even if the sensors would be attached indirectly to the wall. Even if there would be a layer of known substance between the sensor and the shell wall, the measurement value of a sensor can be corrected to correspond to the shell wall temperature with adequate accuracy using the thermal conductivity of the layer substance and thickness of the layer. The attachment may also be accomplished by means of a suitable intermediate piece which is for example welded to the wall 16. The basic idea of the invention is that the array 30 of sensors 31 is non-removably arranged and configured for service of lifetime of the tank and the redundancy of sensors is taken care of by arranging the sensor. The distribution of sensors, i.e. distances between the adjacent sensors can be determined by simple experiments or calculation, taking into account the desired resolution.

As is shown in the FIG. 1 the sensors are in the insulation cavity 20 such that they cannot be accessed from outside by using non-destructive means. More particularly the figure depicts an embodiment of the invention where the sensors are embedded in the insulation provided in the insulation cavity 20 such that the sensors are not accessible from outside by using non-destructive means. In practice this means that tank is built without any service doors to the outer shell 18 for accessing the sensors.

Each one of the sensors 31 are arranged in data transfer communication by means of a data wire or a data bus 34 to with the interface 32. The interface acts as a link between the sensors and a computer unit arranged in connection with the interface 32. The computer unit comprises executable instructions in a form of a computer program, which when executed in the computer unit 36 provides monitoring information based on temperature data obtained from the sensors 31. More specifically the computer unit is configured i.a. by means of the computer program to obtain temperature data from the sensors 31 in the array of sensors 30. Advantageously the data comprises data from each one of the sensors 31. Additionally the computer program is configured to perform a validity check of the sensors 31 of the array of sensors, In order to provide service life of the array 30 to last a nominal expected lifetime of the tank 10 defined by the manufacturer, it is made possible by the invention that even if some of the sensors may become inoperable for any reason, the surface level of the liquefied gas in the tank can be determined by making use of other, still operable sensors. The computer program comprises instructions to perform a validity check of a sensor so that in a case a sensor fails the validity check the temperature data is discarded from further processing, that is not used in the process of determining the state of the gas in the tank 10. The computer unit 36 comprises further executable instructions to, by making use of sensors passed the validity check only, determine the state of the gas based on the temperature data of the passed sensors.

Figure 2:
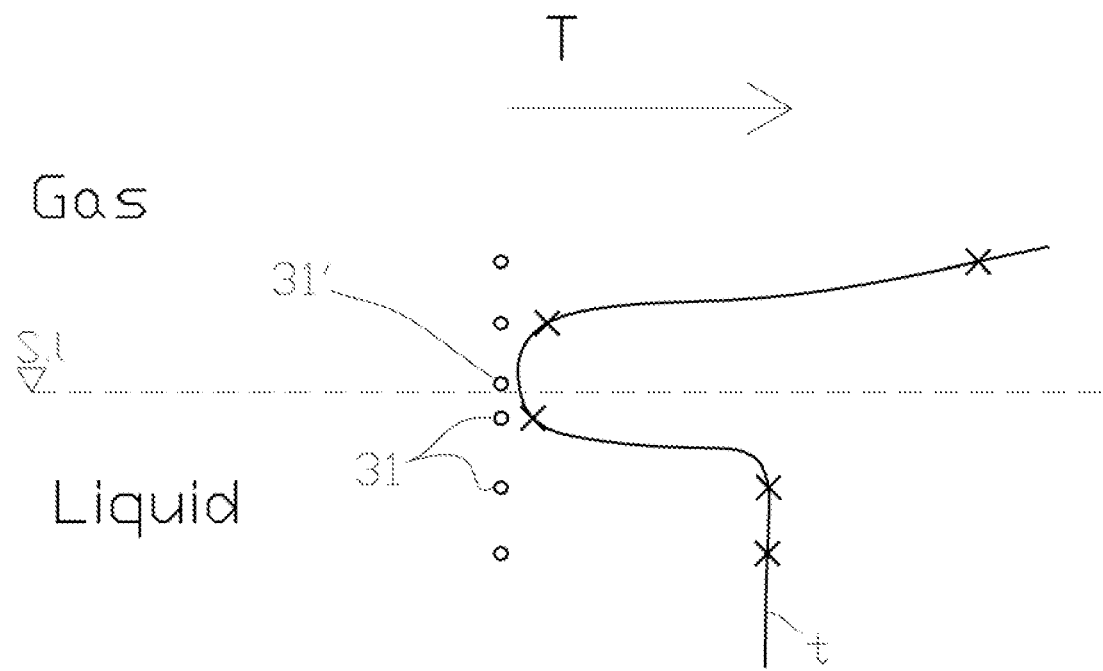
FIG. 2 illustrates a detail relating to a principal of determining the surface level of a cryogenic liquefied gas tank according to an embodiment of the invention.

The information containing the actual vertical position of each one of the sensors 31 in the tank 10 is stored in or made available to the computer unit 36 an thus the temperature data can be used for determining the liquid level in the tank 10. With a reference to the FIG. 1, for sake of an example, if one assumes that the sensor 31' just above the liquid level S.I does not pass the validity check, according to an embodiment shown in the FIG. 1, its temperature data is discarded and replaced with interpolated temperature data which is calculated using temperature data which passed the validity check. In the FIG. 2 there is shown the surface S.I of the liquefied gas in the tank 10, the liquid phase below and gas phase above the surface. The curve t illustrates the temperature behaviour at the transition region between the liquid to the gas phase where the direction to the right represents increasing temperature. The crosses in the FIG. 2 represent the temperature data of each sensor passed the validity check at the determined vertical positions. The temperature of the liquid decreases near the surface due to natural boil-off in which the evaporation of the gas consumes energy from the liquid decreases its temperature causing a recognizable local minimum to form at the surface level. This can be used in determining the liquid level. Also, the temperature of the liquefied gas is considerably lower than that of the gas above the surface of liquefied gas. Also this can be used in determining the liquid level. Now, the temperature data of the discarded sensor 31' can be replaced by an interpolated value obtained by making use of adjacent sensors which passed the validity check in the vertical array 30. Thus the computer unit 36 comprises executable instructions to determine the vertical location of the surface level S.I of liquefied gas by reading sensors 31 in the vertical array of temperature sensors, and to replace any discarded temperature data 31' with interpolated temperature data calculated using temperature data of sensors 31 which passed the validity check.

Now, this way by means of the cryogenic liquefied gas tank 10 as depicted in the FIG. 1 it is possible to practise a method of monitoring liquefied gas comprising first arranging an array 30 of temperature sensors 31,31' for measuring temperature of an inner shell wall 16' of the tank on opposite side to a storage space of the tank, reading sensors 31, 31' in the array of temperature sensors obtaining temperature data, performing a validity check of the sensors of the array 30 of temperature sensors, and in a case a sensor 31' fails the validity check discarding the temperature data from further processing, and by making use of sensors 31 passed the validity check only, determining a state of the gas based on the temperature data of the passed sensors.

The validity check of the sensors may be performed by setting a reference value for the temperature data of the sensors, and comparing each temperature data of the sensors to the reference value. Optionally, the reference value can be set so that it is based on practical experience to be such that it represent a reasonably good estimate for a temperature of a properly functioning sensor so that possible malfunction of a sensor is recognizable. Optionally, the reference value can be set be a temperature data of one of the sensors in the array which is confirmed to be operable. Thus, in a case where difference of the temperature data to the reference value is more than a predetermined allowed value discarding the temperature data of the sensor from further processing. The vertical location of the surface level of liquefied gas in the tank is determined based on making use of sensors passed the validity check only.

The difference of the temperature data to the reference value can be understood also as using a range i.e. setting a reference value range for the temperature data of the sensors, and in a case where the temperature data is not within the reference value range the temperature data is discarded from further processing.

Figure 3:
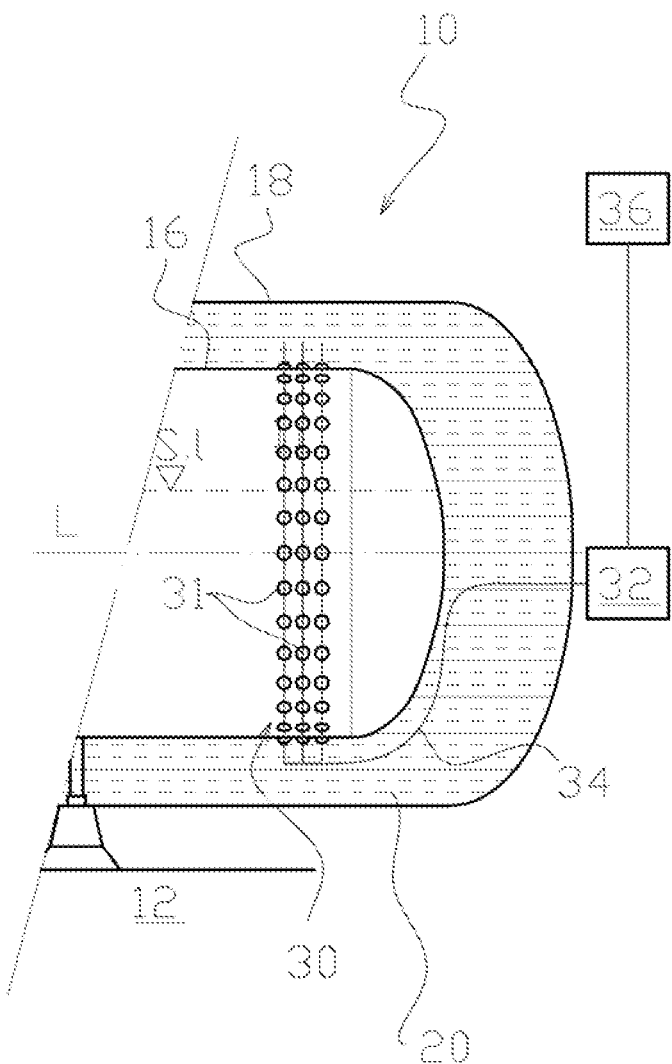
FIG. 3 illustrates a cryogenic liquefied gas tank according to another embodiment of the invention.

In the FIG. 3 there is shown schematically an end part of a cryogenic liquefied gas tank 10, which is for its most part similar to that shown in the FIG. 1. The tank 10 shown in the FIG. 3 does not include a tank connection space like the one shown in the FIG. 1, and it should be understood that that the tank connection space is only an optional feature. Usually the tank connection space is required in marine solutions but not necessarily in land based tanks. The distinctive difference of the tank 10 shown in the FIG. 3 to that in the FIG. 1 is that, while the tank 10 comprises an array 30 of temperature sensors 31, the array 30 is a two dimensional array of sensors 31. In other word the sensors 31 in the array comprise several horizontal rows and several vertical columns i.e. it is configured as a matrix. In the embodiment shown in the FIG. 3 the array of 30 temperature sensors 31 comprises a number of sensors 31 which are arranged to the tank 10 at predetermined positions in three vertical columns such that there are three horizontally adjacent sensors 31 at each horizontal row. The number of horizontally adjacent sensors may vary depending on the case. The terms vertical and horizontal should be understood also here so that horizontal represents general direction of free surface of the liquefied gas and vertical represents direction perpendicular to the horizontal direction i.e. the direction of normal of the general direction of the surface of the liquefied gas. In the FIG. 3 the array is configured to determining the vertical location of the surface level of liquefied gas in the tank 10. The array of sensors extends vertically from bottom to top of the tank. The distribution of the sensors vertically or horizontally is not necessarily made even, and the vertical distances between sensors may be different.

According to the embodiment of the invention depicted in the FIG. 3 the array 30 is configured for monitoring liquefied gas in the cryogenic liquefied gas tank 10. By means of the array 30 of the sensors 31 it is possible to define the surface level of the liquefied gas in the tank. The monitoring arrangement and method in the FIG. 3 corresponds to that in the FIG. 1 but in the embodiment of the FIG. 3 the method comprises reading sensors in the array of temperature sensors obtaining temperature data, performing a validity check of the sensors of the array of temperature sensors, in a case a sensor fails the validity check discarding the temperature data from further processing, and making use of sensors passed the validity check only, determining a state of the gas based on the temperature data of the passed sensors. In this embodiment a temperature data of a discarded sensor advantageous is replaced with a temperature data of a sensor which passed the validity check at the same vertical row as the discarded sensor. When the number of sensors in a row is N it is possible to use the array 30 without decreasing the accuracy or resolution even is N-1 sensors in the same row fails to operate.

Also in the embodiment of the FIG. 3 the validity check of a sensor can be, and advantageously, is performed by setting a temperature data of horizontally adjacent sensors in the array to be the reference value the particular row of sensors.

In the embodiment shown in the FIG. 3 it is also conceivable that in case all of the sensors at same vertical row become unusable, or will fail the validity check, temperature data is discarded and replaced with interpolated temperature data which is calculated using temperature data of vertically adjacent sensors which passed the validity check as is explained in connection with the FIG. 2.

It should also be noted that in the embodiment of FIG. 3 the computer unit 36 comprising executable instructions to determine the vertical location of the surface level of liquefied gas by reading superimposed sensors in the array of temperature sensors and replacing any discarded temperature data with temperature data of a sensor which passed the validity check being horizontally most adjacent to the discarded one.

Figure 4:
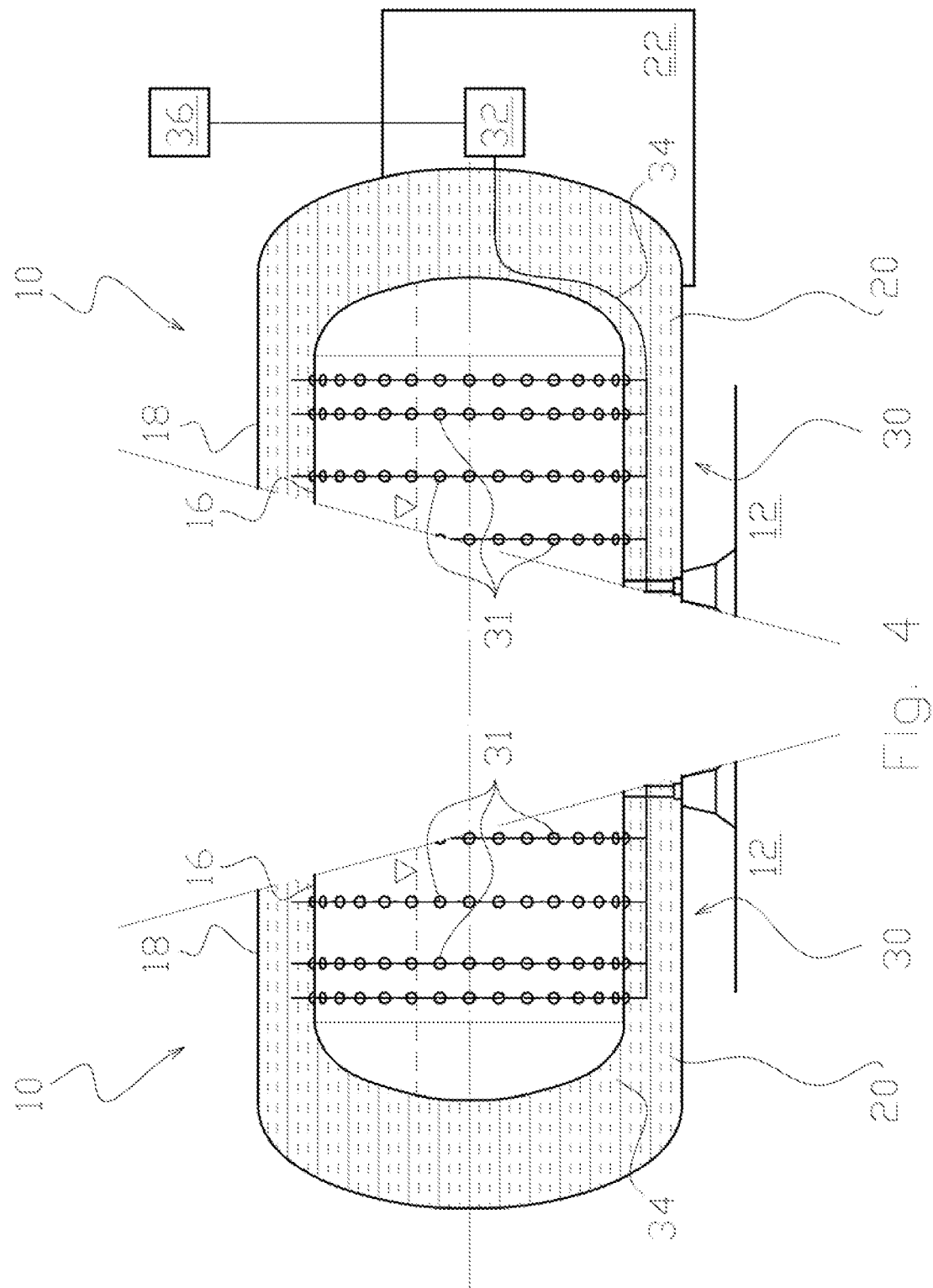
FIG. 4 illustrates a cryogenic liquefied gas tank according to another embodiment of the invention.

In the FIG. 4 there is shown schematically an end part of a cryogenic liquefied gas tank 10, which is for its most part similar to that shown in the FIG. 1. The distinctive difference of the tank 10 shown in the FIG. 4 to that in the FIG. 1 is that, while the tank 10 comprises an array 30 of temperature sensors 31, which is a two dimensional array of sensors 31 extending from one end of the tank to the opposite end. This configuration of the array 30 makes it possible to define both the surface level of the liquefied gas in the tank, and also two dimensional temperature distribution of the gas, both the liquefied portion and the gaseous portion, in the tank 10. In the embodiment shown in the FIG. 4 the array of 30 temperature sensors 31 comprises a number of sensors 31 which are arranged to the tank 10 at predetermined positions in several vertical columns such that there are multiple horizontally adjacent sensors 31 at each horizontal row. The number of horizontally adjacent sensors may vary depending on the case. In the FIG. 4 the array is configured to determining mainly the temperature distribution of the in the tank 10. The array of sensors extends vertically from bottom to top of the tank. In practise, in the embodiment shown in the FIG. 4 there are at least two adjacent arrays of vertically distributed sensors 31. According to an embodiment of the invention the tank 10 provided with an array of sensors near its both ends, and optionally on between them.

The distribution of the sensors vertically or horizontally is not necessarily made even, and the distances between sensors may be different. The number and the distribution of sensors, i.e. distances between the adjacent sensors can be determined by simple experiments or calculation, taking into account the desired resolution of the case.

The vertical location of the surface level of liquefied is determined at a first horizontal position or a sensor column by reading a first column of vertically superimposed sensors in the array of temperature sensors, and the vertical location of the surface level of liquefied is determined at a second horizontal position by reading a second column of vertically superimposed sensors in the array of temperature sensors. This provides an effect of making it possible to define the liquid level in a case the tank is slanted. This could take place in an installation in a marine vessel.

Also in the embodiment of the FIG. 4 replacement of any discarded temperature data with temperature data of a sensor which passed the validity check being horizontally most adjacent to the discarded one provides redundancy of the array 30. Reading a second column of horizontally superimposed sensors in the array of temperature sensors can be used for replacing any discarded temperature data with temperature data of a sensor which passed the validity check being horizontally most adjacent to the discarded one.

Figure 5:
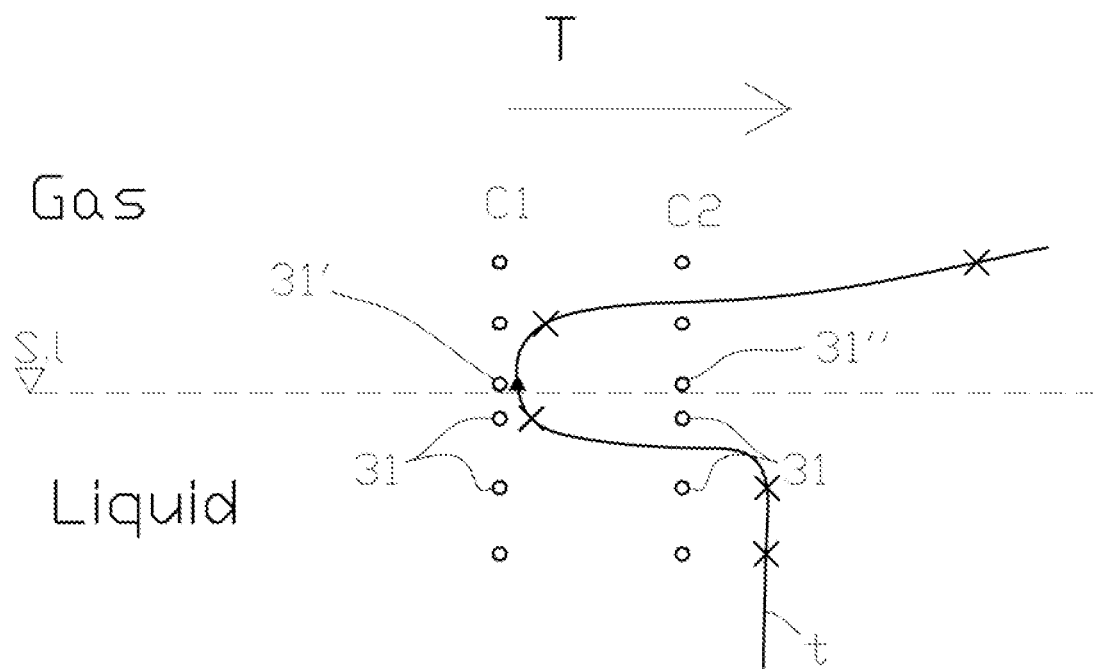
FIG. 5 illustrates a detail relating to a principal of determining the surface level of a cryogenic liquefied gas tank according to another embodiment of the invention.

In the FIG. 5 there is shown the surface S.I of the liquefied gas in the tank 10, the liquid phase below and gas phase above the surface. The curve t illustrates the temperature behaviour at the transition region between the liquid to the gas phase where the direction to the right represents increasing temperature. The crosses in the FIG. 5 represent the temperature data of each sensor in the column C1 which passed the validity check at the determined vertical positions. Now, the temperature data of the discarded sensor 31' can be replaced by a temperature data of a sensor 31" in the adjacent column C2 which passed the validity check and is horizontally most adjacent to the discarded sensor 31'. The triangle sign in the FIG. 5 represent the temperature data of the sensor 31" in the column C2.

Thus the computer unit 36 comprises executable instructions to determine the vertical location of the surface level S.I of liquefied gas by reading sensors 31 in the vertical array of temperature sensors, and to replace any discarded temperature data 31' with temperature data of a sensor 31" which passed the validity check being horizontally most adjacent to the discarded one.

In the figures the tank 10 is a horizontal cylindrical tank, but it can be also vertical i.e. having its center axis substantially vertical. The tank may also be an atmospheric tank and/or it may be of different form such as spherical or prismatic tank. The sensors are only on one side of the tank in the figures, but they may be arranged on e.g. each wall section of the tank circumscribing the tank.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

The invention claimed is:

1. A method of monitoring a liquefied gas in a cryogenic liquefied gas tank having an inner shell and an outer shell and an insulation between the inner and outer shell, the method comprising:
arranging an array of temperature sensors for determining a temperature of an outer surface of the inner shell of the tank at different vertical positions;
reading sensors in the array of temperature sensors for obtaining temperature data;
performing a validity check of the sensors of the array of temperature sensors;
discarding, in a case where a sensor fails the validity check, the temperature data from further processing; and
determining a state of the liquefied gas based on the temperature data of the sensors which passed the validity check.

2. The method of monitoring a liquefied gas in a cryogenic liquefied gas according to claim 1, wherein the determining the state of the liquefied gas comprises:
determining a vertical location of a surface level of the liquefied gas in the tank based on the temperature data of the sensors which passed the validity check.

3. The method of monitoring a liquefied gas in a cryogenic liquefied gas tank according to claim 2, comprising:
determining the vertical location of the surface level of the liquefied gas by reading sensors in the array of temperature sensors, the array of temperature sensors being arranged vertically, and replacing any discarded temperature data with interpolated temperature data calculated using temperature data of sensors which passed the validity check.

4. The method of monitoring a liquefied gas in a cryogenic liquefied gas tank according to claim 1, comprising:
performing the validity check of the sensors by setting a reference value for the temperature data of the sensors;
comparing each temperature data of the sensors to the reference value; and
in a case where a difference of the temperature data to the reference value is more than a predetermined allowed value, discarding the temperature data of the sensor from further processing.

5. The method of monitoring a liquefied gas in a cryogenic liquefied gas tank according to claim 4, comprising:
performing the validity check of the sensors by setting a temperature data of one of the sensors in the array of temperature sensors to be the reference value for the temperature data of the sensors.

6. The method of monitoring a liquefied gas in a cryogenic liquefied gas tank according to claim 4, comprising:
performing the validity check of a sensor by setting a temperature data of a horizontally adjacent sensor in the array of temperature sensors to be the reference value.

7. The method of monitoring a liquefied gas in a cryogenic liquefied gas tank according to claim 1, wherein the array comprises:
temperature sensors arranged at different predefined vertical and horizontal positions.

8. The method of monitoring a liquefied gas in a cryogenic liquefied gas according to claim 7, comprising:
- using only sensors which passed the validity check, determining a two dimensional temperature distribution of the liquefied gas in the tank based on the temperature data of the sensors which passed the validity check.

9. The method of monitoring a liquefied gas in a cryogenic liquefied gas tank according to claim 7, wherein the determining the state of the liquefied gas comprises:
- determining a vertical location of a surface level of the liquefied gas by reading superimposed sensors in the array of temperature sensors, and replacing any discarded temperature data with temperature data of a sensor which passed the validity check and which is horizontally most adjacent to a sensor which provided the discarded data.

10. The method of monitoring a liquefied gas in a cryogenic liquefied gas tank according to claim 7, wherein the determining the state of the liquefied gas comprises:
- determining a vertical location of a surface level of the liquefied gas at a first horizontal position by reading a first column of vertically superimposed sensors in the array of temperature sensors, and determining the vertical location of the surface level of the liquefied gas at a second horizontal position by reading a second column of vertically superimposed sensors in the array of temperature sensors.

11. The method of monitoring a liquefied gas in a cryogenic liquefied gas tank according to claim 10, comprising:
- replacing any discarded temperature data with temperature data of a sensor which passed the validity check and which is horizontally most adjacent to a sensor which provided the discarded data.

12. A computer readable memory device comprising:
- executable instructions stored in a non-tangible medium which, when executed by a computer, will cause the computer to carry out a method comprising:
- arranging an array of temperature sensors for determining a temperature of an outer surface of an inner shell of a cryogenic tank at different vertical positions;
- reading sensors in the array of temperature sensors for obtaining temperature data;
- performing a validity check of the sensors of the array of temperature sensors;
- discarding, in a case where a sensor fails the validity check, the temperature data from further processing; and
- determining a state of a gas in the tank based on the temperature data of the sensors which passed the validity check.

13. A cryogenic liquefied gas tank comprising:
- an inner shell and an outer shell;
- an insulation between the inner and outer shells; and
- a monitoring arrangement having an array of temperature sensors, wherein the monitoring arrangement includes a computer unit having executable instructions for causing the computer unit to obtain temperature data from sensors in the array of temperature sensors, to perform a validity check of the sensors of the array of temperature sensors, to discard, in a case where a sensor fails the validity check, the temperature data of the sensor from further processing, and to use only sensors which passed the validity check for determining a state of a gas in the tank based on the temperature data of the sensors which passed the validity check.

14. The cryogenic liquefied gas tank according to claim 13, wherein the array of temperature sensors is in an insulation cavity between the inner and outer shells.

15. The cryogenic liquefied gas tank according to claim 13, wherein:
- the sensors of the array of temperature sensors are arranged at different predefined vertical positions.

16. The cryogenic liquefied gas tank according to claim 13, wherein:
- the sensors of the array of temperature sensors are arranged at different predefined vertical and horizontal positions.

17. The cryogenic liquefied gas tank according to claim 13, wherein the executable instructions for determining the state of the liquefied gas comprise:
- executable instructions to determine a vertical location of a surface level of the liquefied gas by reading sensors in the array of temperature sensors, the array of temperature sensors being arranged vertically, and to replace any discarded temperature data with interpolated temperature data calculated using temperature data of sensors which passed the validity check.

18. The cryogenic liquefied gas tank according to claim 13, wherein the executable instructions for determining the state of the liquefied gas comprise:
- executable instructions to determine a vertical location of a surface level of the liquefied gas by reading superimposed sensors in the array of temperature sensors, and replacing any discarded temperature data with temperature data of a sensor which passed the validity check and which is horizontally most adjacent to a sensor which provided the discarded data.

* * * * *